United States Patent [19]
Chase

[11] Patent Number: 5,816,581
[45] Date of Patent: Oct. 6, 1998

[54] ID CHUCK PROVIDING WORKPIECE REGISTRATION AND OPERABLE BY PUSH OR PULL TO ATTACH A WORKPIECE

[76] Inventor: R. Lee Chase, 16537 Wilderness, Cypress, Tex. 77429

[21] Appl. No.: 802,728

[22] Filed: Feb. 20, 1997

[51] Int. Cl.⁶ .................................................. B23B 31/40
[52] U.S. Cl. ........................ 279/2.03; 279/2.04; 279/2.12
[58] Field of Search .................... 279/2.02–2.04, 279/143, 145, 2.09, 2.12

[56] References Cited

U.S. PATENT DOCUMENTS

| | | | |
|---|---|---|---|
| 2,494,899 | 1/1950 | Ross | 279/2.03 |
| 2,949,313 | 8/1960 | Moser et al. | 279/2.09 |
| 2,996,301 | 8/1961 | Cox | 279/2.02 |
| 3,490,778 | 1/1970 | Parker | 279/2.04 |
| 4,088,332 | 5/1978 | Chase | 279/2.04 |
| 4,416,459 | 11/1983 | Morawski et al. | 279/2.09 |
| 5,133,565 | 7/1992 | Schmidt | 279/2.04 |

*Primary Examiner*—Steven C. Bishop
*Attorney, Agent, or Firm*—Gunn & Associates, P.C.

[57] ABSTRACT

An ID chuck is defined by a rotating tube pushed or pulled by a left hand cylinder and piston. The tube moves an extender cooperating with a plug surrounded by a set of collet fingers. The fingers move radially to lock a workpiece against a registration surface, and move inwardly to release the workpiece.

19 Claims, 3 Drawing Sheets

ID CHUCK PROVIDING WORKPIECE REGISTRATION AND OPERABLE BY PUSH OR PULL TO ATTACH A WORKPIECE

BACKGROUND OF THE DISCLOSURE

A typical lathe is equipped with a head stock which supports a three or four jaw chuck. The jaws are opened and closed to grip from the exterior. This secures a workpiece prior to machining. It is tedious to open and close the jaws of a chuck. When this is done repetitively, substantial time can be spent, time that call otherwise be devoted to machining. Devices have been made in the past which automatically open and close the jaws. When the jaws open and close, they will seize, grasp, hold and centralize a workpiece. It is, however, somewhat difficult to inake lengthwise registration simultaneous with the attachment of the workpiece to the chuck.

This is especially needed when a repetitive task must be carried out. The lathe may have numeric controlled features (NC hereinafter) which enable the machining process to be carried out in an automatic sequence. The sequence, while automated, is not useful unless and until the workpiece is properly registered with respect to a reference point on the chuck. It is possible to use sacrificial or disposable jaw inserts. Thus, the inserts configure the size and shape of the jaws so that the workpiece can be inserted only at one location. Substantial effort has to be devoted as a preliminary matter to workpiece jaw preparation. Once the workpiece has been machined for the requisite number of units, the jaws can then be discarded. This is advantageous but it is accomplished only at a cost. The cost is the time required to initially machine, to the proper dimensions the sacrificial jaws.

It is possible using the right type of tailored jaws to grip the inside or ID of a tubular workpiece. That again is accomplished at a substantial cost. The present disclosure sets out a completely different mechanism for machining repetitive workpieces. It is a chuck which provides a registration shoulder for the workpiece. The workpiece can be readily jammed against a selected shoulder so that workpiece registration can be accomplished. This enables automated machining to occur thereafter. This locates the lathe initiated machining at the proper location on the workpiece. This permits repetitive machining to be done on a large number of workpieces, but is equally advantageous because it can be used where there are only a few duplicated parts to be made. This avoids the necessity of making customized, sacrificial jaw inserts. Moreover, it has the advantage of providing a collet which grips from the ID on internal radial expansion of the collet within tubular stock workpieces. This is done through the movement of a push or pull draw tube.

Through the use of a draw tube, readily available hydraulically operated piston and cylinder arrangements can be attached at the left side of the head stock. Well known hydraulically operated draw tube power mechanisms such as a hydraulic cylinder can be installed. The draw tube extends through the full width of the head stock. The present apparatus is affixed to the draw tube so that the ID gripping device of the present disclosure can be operated either by pushing or pulling.

One advantage of the present apparatus devices from the fact that a registration surface for abutting against the end of an ID workpiece permits quick mounting and demounting of each workpiece. By hydraulic operation of a draw tube, release call be achieved so that the draw tube is stroked for a short stroke, thereby disengaging or engaging the workpiece. The workpiece is installed by simply hand mounting the workpiece against a registration surface. While held against the registration surface, hydraulic operation is initiated, and the draw tube is either pushed or pulled, this being accomplished for similar but oppositely triggered embodiments and the chuck expands radially at the ID of the workpiece. The piece is gripped and held against that registration surface. Machining can then be initiated without making any measurements. Machining is then quickly triggered so that the manufacturing process can be carried out with NC accuracy and repeatability. Proficiency is also enhanced because the NC cutting procedures can then be carried out at maximum speed. When the NC machining process is over, the finished workpiece can be released from the grip at the ID, and the next workpiece call then be installed. This removal of a finished workpiece and insertion of another workpiece is done readily and easily.

The present disclosure is summarized as a draw tube operated ID gripping chuck. It is initiated in operation in one embodiment by pushing the draw tube. In an opposite type embodiment, the draw tube is pulled. Whether pushing or pulling grip on the ID of the workpiece is initiated. This works in conjunction with a registration surface so that precise gripping at the ID is accomplished. This permits the chuck of the present disclosure to expand radially outwardly for gripping and to retract inwardly for release. All of this is triggered by hydraulic operation of the draw tube which, in one version, is pushed to grip the workpiece, and in the other embodiment, the draw tube is pulled for operation. Detailed descriptions of both embodiments are given below.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE FIRST EMBODIMENT

Figure 1:
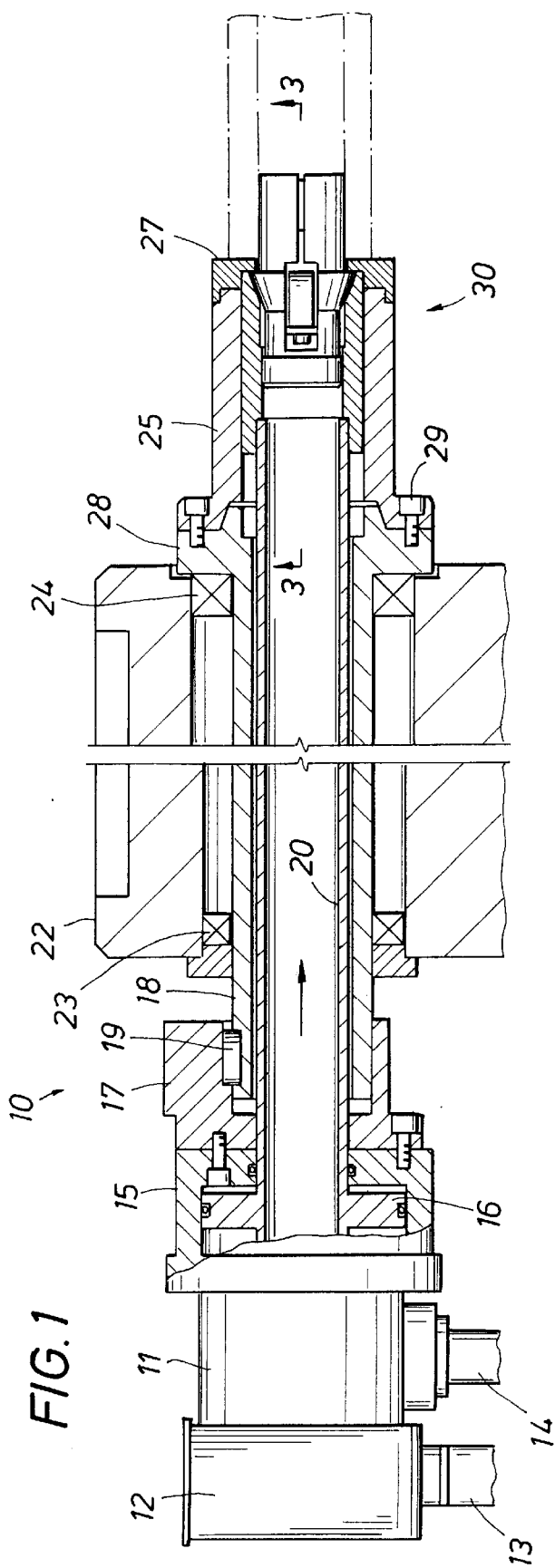
FIG. 1 is a sectional view through a head stock of a lathe incorporating the draw tube operated ID chuck of the present disclosure.

Attention is now directed to FIG. 1 of the drawings the a description of the lathe and the draw tube mounted on the lathe. This part of the description will set the context for the installation of the draw tube operated chuck. That description will follow after setting the stage with this lathe description.

In FIG. 1, the numeral 10 identifies the rotating equipment located at the head stock of a lathe. The equipment incorporates a cylinder 11 which does not rotate. The cylinder 11 incorporates a cylinder head 12, and that in turn is connected with hydraulic lines 13 and 14. The lines 13 and 14 provide hydraulic or pneumatic fluid under pressure to provide movement or actuation by a double acting piston and cylinder construction. The cylindrical body connects. however, with a cylindrical body 15 which does rotate. The cylinder 15 and all the equipment shown to the right of the cylinder 15 is rotated by the lathe. The speed of rotation is determined by lathe operation. The rotation and direction of rotation is also determined by operation of the lathe.

The cylinder 15 encloses a piston 16 which is driven by fluid to one of two positions. The internal hydraulic or pneunmatic fluid circuit has been omitted for sake of clarity; the piston 16 is typically double acting so that it can be driven to the left or right. In the full line illustration of FIG. 1, the cylinder 15 encloses the piston 16 which is shown at the right hand end of its movement. Piston movement is under control of the operator who provides fluid delivered through the lines 13 and 14 which forces the piston to the extremity of its movement. Therefore, the piston 16 has two positions one position being shown in FIG. 1 and it is retractable to the left as viewed in FIG. 1. This operates the equipment as will be explained in detail.

The cylinder 15 is affixed by bolting to all adaptor 17. The adaptor 17 is joined to a rotating stock 18. The stock 18 is joined by means of a key 19. This assures that they rotate together. The stock 18 is an elongate strength bearing member which rotates under power. It supports a smaller, lighter weight draw tube 20 which is on the interior. The draw tube 20 is attached to the piston so the draw tube 20 is actuated by the piston 16. As shown in FIG. 1. the piston 16 is moved to the right and the draw tube 20 is forced to the right. An arrow marked on FIG. 1 shows the direction of movement.

The stock 18 passes through a stationary head structure 22. The head supports, aligns and registers the stock 18. The stock is rotated in a first bearing assembly 23 at one end of the head stock 22, and another bearing assembly 24 Supports the head 22 with respect to the rotating tubular stock. Rotation is accomplished at a speed and direction that is determined by operation of the lathe. Rotation of the head stock at a specified speed and direction is believed an aspect of lathe operation which need not be detailed.

The stock 18 incorporates a surrounding flange which connects with an attached extender 25. It incorporates the end located registration shoulder 27. The shoulder 27 serves as a registration surface for the ID chuck which will be detailed.

The extender 25 joins to the stock 18 at a flange 28 and is connected with it by several bolts 29. The extender 25 serves as an external housing which surrounds the draw tube 20. The draw tube 20 is movable to operate the ID chuck which will be described substantially with regard to FIGS. 2 and 3.

Figure 6:
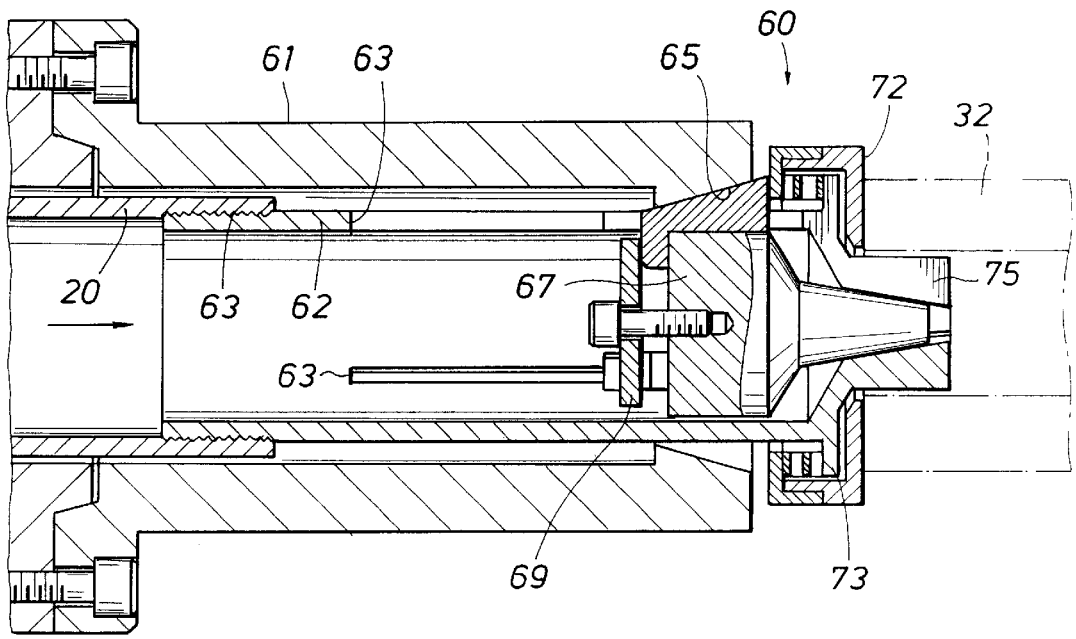
FIG. 6 shows a second embodiment of the ID chuck which responds to opposite motion by the draw tube.
Figure 7:
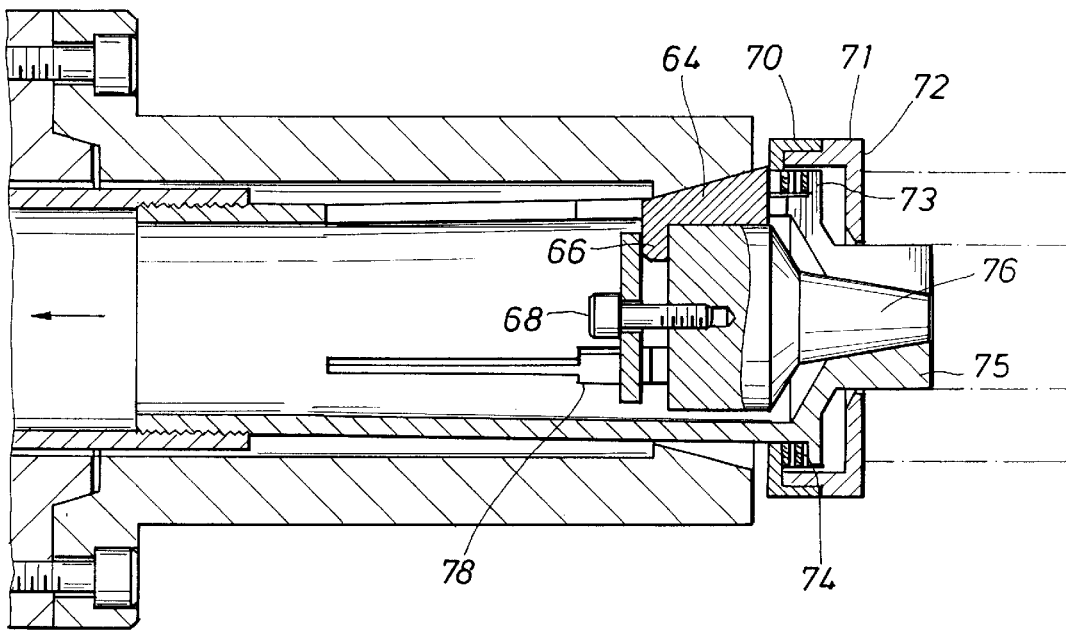
FIG. 7 is a view similar to FIG. 6 of showing the second embodiment of the ID chuck which responds to opposite motion of the draw tube.

Summarizing what has been set forth to this juncture, the head stock 22 does not rotate. It is fixed to the head end of the lathe and supports the rotating stock 18 which extends throught it and which is supported on the bearings 23 and 24. Rotation is permitted while lateral movement of the head stock 18 is not permitted. The stock 18, however, is an elongate hollow member. On the interior, the draw tube rotates with it but the draw tube 20 call be reciprocated at the urging of the hydraulic or pneumatic apparatus shown at the left end. Accordingly, operation is triggered by movement of the draw tube 20. Operation of the draw tube 20 involves linear movement of the draw tube. There are two embodiments set forth, the first being the embodiment 30 which is shown in detail in FIGS. 2 and 3. The second embodiment is shown in FIGS. 6 and 7 jointly. The two embodiments are triggered in operation by opposite reciprocation of the draw tube. The embodiment 30 is actuated with movement of the draw tube in one direction. It is retracted by reversing movement of the draw tube. The draw tube is operated in the opposite fashion for the second embodiment. More will be noted regarding this difference in operation.

Figure 2:
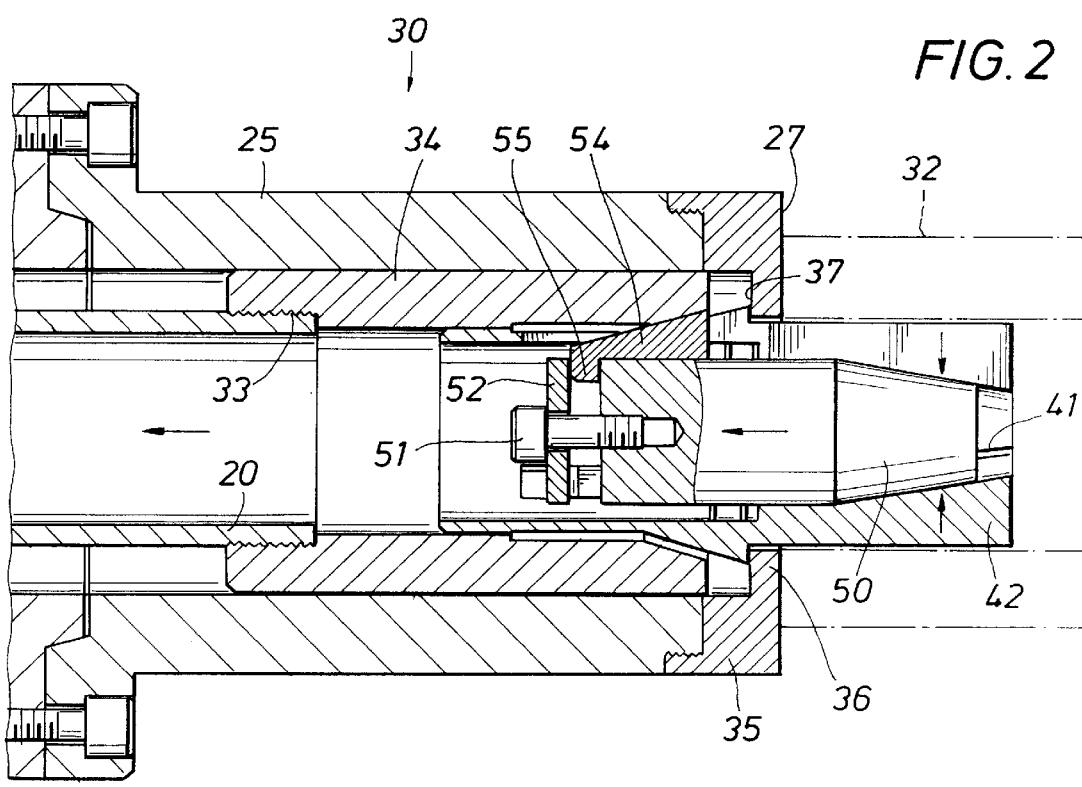
FIG. 2 is an enlarged detail view of the ID chuck of the present disclosure which is operated by pulling the draw tube which results in ID retraction with respect to the workpiece.

Going now to FIG. 2 of the drawings, an enlarged view of the ID chuck 30 is shown. It is shown with a workpiece illustrated in dotted line at 32. The workpiece is shown registered against the shoulder 27. The extender 25 is also shown in FIG. 2. It functions as a housing for certain components as will be detailed. Moreover, FIG. 2 shows the push tube 20 which threads at a set of threads 33 to a chuck sleeve 34. The sleeve 34 is a hollow, thicker wall member threading to the tube 20 to permit the tube 20 to impart sliding movement to the sleeve 34. Contrasting FIGS. 2 and 3, the sleeve 34 is shown to the left with a pulling motion to the left, and is pushed to the right. The latter is shown in FIG. 3 and such movement bottoms as will be detailed.

Figure 3:
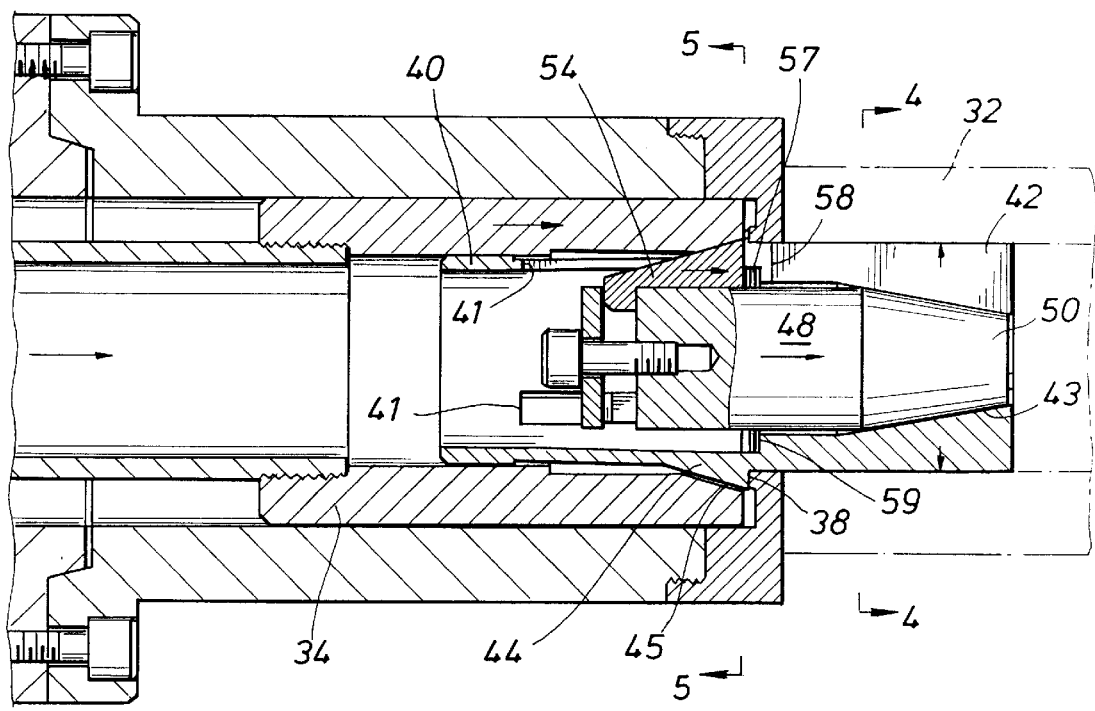
FIG. 3 is a view similar to FIG. 2 showing the draw tube pushed to operate the ID chuck of the present disclosure to expand and thereby grip the workpiece.

As shown in contrast between FIGS. 2 and 3. the sleeve 34 is free to slide on the interior of the threaded end member 35 which includes the exposed registration surface 27. That is constructed with an inwardly directed encircling lip 36. The lip 36 supports an internal shoulder 37 parallel to the end located face 27. The shoulder 37 is used for internal part registration against the shoulder 37. The shoulder 37 provides a circular internal base for registration purposes, but it is also constructed with an interrupted set of gaps. Such gaps define circular segments 38 as illustrated at the bottom of FIG. 3 of the drawings.

FIG. 3 shows a solid ring 40 constructed with a set of lengthwise splits 41. The split 41 is replicated so that there are three fingers of equal circumferencial width. The splits 41 extend from the ring 40 at the left hand side to the very end of the structure, thereby defining a deflected collet finger 42. The collet finger is shaped with an internal taper 43. The tapered face 43 is on the interior of the three collet fingers. Going momentarily to FIG. 4 of the drawings, the workpiece 32 is shown on the exterior of the three collet finger 42. The collet fingers are separated by the split 41 which extends the full length of the collet fingers. The collet fingers define a smooth cylindrical external surface. This surface extends on the exterior as shown in FIG. 3 of the drawings except it is interrupted by an abutting shoulder 44 which surrounds the three collet fingers. The shoulder is interrupted by the three splits at 41, and it has an abutting surface or face which bears against the raised shoulder 38 shown in FIG. 3 of the drawings. The shoulder 38 limits travel to the right of the collet fingers. The collet fingers are forced to the right but travel is limited by the shoulder 38 abutting against the external collet shoulder 44. The shoulder 44 is a tapered shoulder as shown in FIG. 3; for that purpose, the sleeve 34 is chamfered at 45 to make room for the shoulder 44 on the collet fingers.

The chamfer 45 also forces the collet fingers to the right hence moving the ring 40 in a limited range of movement shown in FIG. 3.

The chuck 30 incorporates a cylindrical plug 48 which is constructed with a tapered nose 50. The tapered nose 50 conforms to the inside face and taper 43 on the collet fingers. When the plug 48 moves to the right, the collet fingers are forced radially outwardly. FIG. 2 shows the plug moved to the left so that the collet fingers flex radially inwardly. FIG. 2 therefore shows the collet fingers in a released position. Release occurs when the fingers are retracted inwardly. The workpiece 32 in FIG. 3 is grasped on the interior. Since it is registered against the shoulder 27, and grasped internally, it is held in a registered position.

Figure 5:
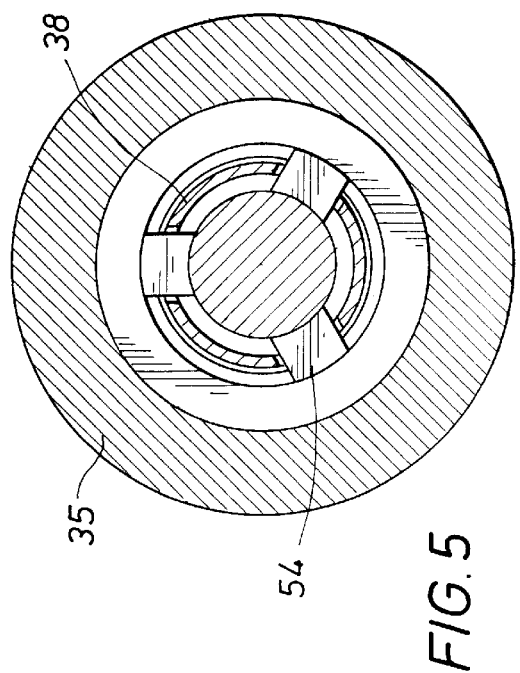
FIG. 5 is a sectional view along the line 5—5 of FIG. 3 showing details of construction of the draw tube operated chuck of the present disclosure.

The plug 48 is drilled along the centerline at the back end to receive a bolt 51 which holds a lock washer 52 in spaced relationship. The lock washer 52 provides clamping motion against the back of three locking dogs 54 which extend radially outwardly. The locking dogs 54 are also shown in FIG. 5; this view further illustrates how the locking dogs protrude in gaps with reboard to the circular shoulder 38 which is interrupted to provide room for the dogs. The locking dogs 54 have a locking lip 55 which secures the dogs on the plug 48. They are clamped so that they move with the plug. They are able to move with the plug from the retracted condition of FIG. 2 to the right for the position locking the workpiece 32. The dogs have a limited range of travel. Travel is limited by the ring 35.

At the conforming inside face of the dogs 54, there is no room for movement radially inwardly. They are made as separate components for ease of assembly and repair. As shown in the drawings, they limit travel on movement of the plug to the right. On movement to the left, they engage the chamfer 45 as illustrated in either drawing; they serve to limit movement to the left when jammed against the chamfer.

The plug is illustrated at the right extremity of movement in FIG. 3. In that position, it compresses a flat spring 57. The spring 57 can be conveniently made from a stack of Bellville washers. They force the plug to the left. They are expanded in FIG. 2. and are compressed in FIG. 3.

Figure 4:
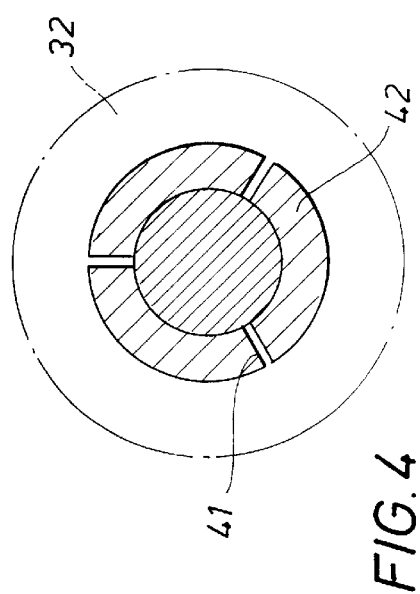
FIG. 4 is a sectional view along the line 4—4 in FIG. 3 showing jaw components on the ID of the workpiece.

FIG. 3 also illustrates the slot 41. The slot is enlarged in width to accommodate the width of the dogs 54. The dogs which are sized to fit in the slot 41 extend outwardly through the slots. The slots need not be uniform along the length; they can be more narrow at the left hand end and the right hand end. For instance, the more narrow construction is shown in FIG. 4 while the broader width is required for the dogs 54 as shown in FIG. 5. It should be noted in FIG. 3 that the slot 41 incorporates a shoulder 58 which is located adjacent to a shoulder 59. The shoulder 59 is on the inside of the collet fingers. It defines the collet fingers so that they are relatively thick at the right hand end of both views while they are relatively thin at the left, having a thickness corresponding to the thickness of the ring 40.

Operation is easily described and involves simple movement of the push tube 20. If the tube is retracted to the left as indicated by the arrow in FIG. 2, the collet fingers flex radially inwardly and release the workpiece 32. Pushing the tube 20 to the right forces the collet fingers radially outwardly to grasp the workpiece 32 from the interior. The workpiece is jammed initially against the shoulder 27 and the ID chuck is then radially expanded outwardly by moving the tube 20 to the right. This motion of the tube 20 is conveyed to the sleeve 34; the sleeve 34 moves to the right and jams the dogs 54 to the right. They carry the plug 48 to the right the nose 50 is pushed into the collet fingers and forces them radially outwardly. The equipment installed on the lathe as illustrated in FIG. 1 normally operates with a simple hand or foot operated switch which moves the piston 16; the tube is therefore moved with a single stroke and the workpiece is grasped as described. Release of the workpiece 32 is achieved by retraction of the pull tube 20, and when that occurs, the pull tube releases the collet fingers so that they flex inwardly and the workpiece can be removed. Removal of a first workpiece after machining and replacement with a blank workpiece is then easily done. This helps engage the next workpiece so that machining can proceed.

DESCRIPTION OF A SECOND VERSION

The foregoing description sets forth the description of the embodiment 30 which is an ID chuck. The embodiment shown in FIGS. 6 and 7 is identified by the numeral 60 and is an alternate form of ID chuck. Operation of this embodiment will be set forth below. A significant aspect of its operation is that the tube is pulled to the left to radially expand. Tube motion occurs in the opposite fashion compared to that of the embodiment 30.

The embodiment 60 cooperates with an extender 61 which is similar in construction at the left to the extender 25 shown in FIG. 2. The tube 20 again terminates in a threaded internal area. The tube 20 threads to a ring 62 at a set of threads 63. The ring is a solid cylindrical hollow sleeve or ring up to the point of a split 63'. The split 63' is replicated at three points equally spaced around the periphery so that three collet fingers are again defined in the structure. Proceeding with FIG. 6, the entender 61 is constructed with a chamfered internal face 65 which engages a set of dogs 64. The three dogs 64 resemble the dogs 54 in the earlier embodiment, and they have a protruding shoulder 66 which extends radially inwardly to lock on the exterior of a plug 67. The plug 67 is threaded at the left and a bolt 68 is received in it. The bolt secures a washer 69 which clamps the protruding tab 66 on each dog so that they are held to the plug 67. The chuck 60 holds the plug 67 in a fixed location with respect to the extender 61. Reciprocating motion of the pull tube 20 imparts movement to other components as will be detailed. The embodiment 60 holds the dogs 64 at a fixed location. In turn, they support, at a fixed location, a housing formed of two joined shell halves. The back shell halt 70 abuts with and joins to a front half 71 and the two together define the registration shoulder or surface 72. That corresponds to the surface 27 shown in FIG. 2. The registration surface 72 works in conjunction with the workpiece 32 to hold it at a fixed or registered location. The shell components 70 and 71 define an internal cavity. On the interior, the collet fingers have a surrounding external lock shoulder 73 which confines a flat spring washer 74. As before, the spring can be formed of a stack of Bellville washers. The washers 74 are compressed in FIG. 7 and are expanded in FIG. 6. That illustrates movement of the shoulder 73 to the right. The collet fingers 75 flex radially outwardly or inwardly for gripping the ID of the workpiece 32. In FIG. 6, they are relaxed because they are moved away from the plug 67 as will be defined. In FIG. 7, they are expanded into a locking position. The collet fingers 75 move inwardly and outwardly with respect to the registration surface 72. The collet fingers 75 move radially inwardly or outwardly and have minimal telescoping movement with respect to the registration shoulder or face 72. The embodiments 30 and 60 work in the same fashion, namely that the collet fingers move out to achieve a gripping position. Both sets of collet fingers shrink to relax thereby releasing the workpiece and they expand outwardly to grasp or clamp, thereby holding the workpiece.

The collet fingers 75 are positioned operatively adjacent to a tapered extension 76 on the plug 67. When the plug moves to the right. it forces the collet fingers outwardly. When it moves to the left, they are retracted. Movement to the left is urged by the spring 74. Movement to the right overcomes that spring and occurs only at the urging of the push tube 20. In that sense, the tube 20 is moved to the right under force as shown in FIG. 6 to achieve a transition from the relaxed and smaller diameter to locking, as shown in FIG. 7. Because of operation of the coil spring with the housing 70 and 71, the registration shoulder 72 does not move with respect to the extender 61.

The fixed component 61 in conjunction with tapered dogs 64 provides a fixed location for the registration face 72. The tapered face is forced against the dogs; this assures that the registration face 72 does not move. On the inside, the deflected collet fingers 75 move when they are forced radially outwardly by the tapered surface 76 on the plug. That surface provides locking motion to hold the workpiece 32. That motion occurs in response to small reciprocation of the tube 20. In turn, that moves to and fro around the dogs 64. The dogs 64 extend through the window 78 which is formed in the slot 63. The slot 63 is relatively narrow at the left hand end as illustrated in FIG. 6 and is also narrow it the collet fingers 74. Operation is triggered solely by movement of the tube 20. When the tube is pulled to the left as shown in FIG. 7, the collet fingers 75 deflect radially outwardly to a locking position. Movement to the right of the tube provides for release.

While the foregoing is directed to the preferred embodiment, the scope thereafter is determined by the claims which follow.

I claim:

1. An ID chuck comprising:
   (a) a headstock tube movable axially between two positions;
   (b) an extender cooperating with one end of said tube and to support an exposed registration surface at right angles with respect to an axis of rotation central of said headstock tube so that a workpiece can be registered thereagainst;
   (c) at least a pair of radially movable jaws defining an ID gripping device extending forwardly of said registration surface and having a gripping surface to reach into and grip a workpiece at an axial passage therein so that the workpiece is gripped and held for rotation imparted by a lathe to said headstock tube;
   (d) a tapered internal surface on said movable jaws;
   (e) a movable plug positioned for movement between first and second positions internally of said movable jaws having an external surface shaped to cooperate with said tapered internal surface on said movable jaws to move said jaws radially outwardly or inwardly into an ID workpiece gripping position so that said jaws grip said workpiece, wherein said workpiece is gripped when said headstock tube is moved axially toward said extender; and
   (f) a connection from said plug to said tube to move said plug in response to said tube.

2. The apparatus of claim 1 wherein said headstock tube passes through the headstock of a lathe and has rotation imparted thereto and said tube is able to rotate at a controlled speed and in a selected direction determined by the lathe.

3. The apparatus of claim 1 wherein said tube is connected to a piston and cylinder supported at one side of a headstock to operate said tube to thereby provide movement between said two positions.

4. The apparatus of claim 3 wherein said tube passes through a headstock which includes bearings to support and align said tube for rotation in said headstock, and said tube moves between said two positions wherein one corresponds to operation of said ID chuck and the other corresponds to reversal of operation of said ID chuck.

5. The apparatus of claim 1 incorporating a ring connected to said extender and said ring has an elongate attached portion thereto having lengthwise splits therein to thereby define said radially movable jaws.

6. The apparatus of claim 5 wherein said ring is relatively thin and said jaws are thicker to define said tapered internal surface on said movable jaws.

7. The apparatus of claim 6 wherein said splits enable said tapering jaws to move radially inwardly and said splits are sufficiently wide to support dogs extending through said splits to define an angled surface exposed on the exterior of said jaws.

8. The apparatus of claim 1 wherein said plug is joined to a washer by a bolt and said washer and plug cooperate in locking a set of dogs to said plug.

9. The apparatus of claim 1 wherein said registration surface is fixedly attached with respect to the end of said extender.

10. The apparatus of claim 9 wherein said registration surface comprises a transverse surface on a member fixedly attached to said extender.

11. A method of aligning a hollow workpiece with an ID chuck on a lathe wherein the method comprises the steps of:
   (a) positioning an internal push tube through a headstock so that motion applied at one end of said tube prompts motion at the other end of said tube between engage and disengage positions;
   (b) positioning an extender at the end of said tube wherein said extender supports a plug having an exposed transverse registration surface at right angles with respect to an axis of rotation for said registration surface so that said registration surface can abut a hollow workpiece positioned thereagainst for machining;
   (c) positioning at least a pair of radially deployed, radially movable jaws cooperating with said plug and defining an ID gripping surface extending forwardly of said registration surface and having a gripping surface thereon to reach into and to grip at the interior ID of a workpiece with axial alignment therewith so that the workpiece is gripped and held for rotation for machining by a lathe and is registered with respect to said registration surface;
   (d) radially moving said jaws
      (i) outwardly in response to movement of said tube in an axial direction toward said extender when said plug is movable with respect to said extender, and
      (ii) outwardly in response to movement of said tube in an axial direction away from said extender when the position of said plug is fixed with respect to said extender;
   (e) radially moving said jaws inwardly for release of said workpiece in response to movement of said tube; and
   (f) wherein said tube movement is initiated independently of headstock rotation applied to said registration surface on operation of a lathe supporting said ID chuck.

12. An ID chuck comprising:
   (a) a headstock tube movable axially between two positions;
   (b) an extender at the end of said tube supporting an exposed registration surface at right angles with respect to an axis of rotation central of said headstock tube so that a workpiece can be registered thereagainst, wherein said extender comprises (i) a ring connected to said extender and said ring has an elongate attached portion thereto having lengthwise splits therein to thereby define said radially movable jaws, (ii) said ring is relatively thin and said jaws are thicker to define said tapered internal surface on said movable jaws, and (iii) said splits enable said tapering jaws to move radially inwardly, and said splits are sufficiently wide to support dogs extending through said splits to define an angled surface exposed on the exterior of said jaws;

(c) at least a pair of radially movable jaws defining an ID gripping device extending forwardly of said registration surface and having a gripping surface to reach into and grip a workpiece at an axial passage therein so that the workpiece is gripped and held for rotation imparted by a lathe to said headstock tube;

(d) a tapered internal surface on said movable jaws;

(e) a movable plug positioned for movement between first and second positions internally of said movable jaws having an external surface shaped to cooperate with said tapered internal surface on said movable jaws to move said jaws radially outwardly or inwardly into an ID workpiece gripping position so that said jaws grip said workpiece; and (f) a connection from said plug to said tube to move said plug in response to said tube.

13. The apparatus of claim 12 wherein said dogs abut said extender to lock against said plug.

14. The apparatus of claim 13 wherein said jaws are at least two, said tube includes a corresponding number of splits to define said jaws, and each of said splits is positioned with and about a dog inserted therethrough.

15. The apparatus of claim 14 wherein said dogs have an external exposed angular face bearing against and in contact to said extender.

16. An ID chuck comprising:

(a) a headstock tube movable axially between two positions;

(b) an extender at the end of said tube supporting an exposed registration surface at right angles with respect to an axis of rotation central of said headstock tube so that a workpiece can be registered thereagainst;

(c) at least a pair of radially movable jaws defining an ID gripping device extending forwardly of said registration surface and having a gripping surface to reach into and grip a workpiece at an axial passage therein so that the workpiece is gripped and held for rotation imparted by a lathe to said headstock tube;

(d) a tapered internal surface on said movable jaws;

(e) a movable plug positioned for movement between first and second positions internally of said movable jaws having an external surface shaped to cooperate with said tapered internal surface on said movable jaws to move said jaws radially outwardly or inwardly into an ID workpiece gripping position so that said jaws grip said workpiece; and (f) a connection from said plug to said tube to move said plug in response to said tube, wherein said connection from said plug to said tube comprises a ring having an adjoined tubular portion thereto and said tubular portion incorporates multiple lengthwise splits therealong to define said radially movable jaws, and said ring is moved with said tube between said two positions.

17. The apparatus of claim 15 including splits along said portion adjacent to said ring, and wherein said splits extend between and define said jaws, and said jaws have a circular face to enable insertion into the ID of a workpiece.

18. The apparatus of claim 17 wherein said jaws have a concentric outer face sized to fit within the ID of a workpiece, and said jaws are positioned on and adjacent to a conforming surface comprising a portion of said plug, and said surface, in conjunction with said plug, defines a member movable by said tube so that extension of said tube pushes said plug axially along said jaws to wedge under said jaws.

19. An ID chuck comprising:

(a) a headstock tube movable axially between two positions;

(b) an extender, wherein
(i) said extender cooperates with which one end of said tube,
(ii) said extender supports an exposed registration surface at right angles with respect to an axis of rotation central of said headstock tube so that a workpiece can be registered thereagainst,
(iii) said registration surface is formed on the end of a hollow housing fixedly attached to said extender, and
(iv) said hollow housing encloses a bias spring maintaining said housing in contact and alignment with said extender;

(c) at least a pair of radially movable jaws defining an ID gripping device extending forwardly of said registration surface and having a gripping surface to reach into and grip a workpiece at an axial passage therein so that the workpiece is gripped and held for rotation imparted by a lathe to said headstock tube;

(d) a tapered internal surface on said movable jaws;

(e) a plug affixed to said extender and having an external surface shaped to cooperate with said tapered internal surface on said movable jaws to move said jaws radially outwardly or inwardly into an ID workpiece gripping position so that said jaws grip said workpiece, wherein said workpiece is gripped when said headstock tube is moved axially away said extender; and (f) a connection from said jaws to said tube to move said jaws in response to said tube.

* * * * *